US009669505B2

(12) United States Patent (10) Patent No.: US 9,669,505 B2
Angel et al. (45) Date of Patent: Jun. 6, 2017

(54) MACHINING CENTER, FLUID DRIVEN SPINDLE SYSTEM, MACHINING CENTER CONVERSION KIT, AND METHOD USING WIRELESS SENSOR FOR ACCESS CONTROL

(71) Applicant: COLIBRI SPINDLES LTD., Lavon Industrial Park (IL)

(72) Inventors: Avigdor Angel, Akko (IL); Baruch Books, Kfar Vradim (IL); Ran Benedik, Karmiel (IL)

(73) Assignee: Colibri Spindles Ltd., Lavon Industrial Park (IL)

( * ) Notice: Subject to any disclaimer, the term of this patent is extended or adjusted under 35 U.S.C. 154(b) by 0 days.

(21) Appl. No.: 15/229,241

(22) Filed: Aug. 5, 2016

(65) Prior Publication Data
US 2016/0339554 A1 Nov. 24, 2016

Related U.S. Application Data

(63) Continuation of application No. PCT/IB2016/000033, filed on Jan. 21, 2016.
(Continued)

(51) Int. Cl.
*B23Q 11/08* (2006.01)
*B23Q 11/00* (2006.01)
(Continued)

(52) U.S. Cl.
CPC ............ *B23Q 11/0089* (2013.01); *B23Q 5/06* (2013.01); *B23Q 11/0891* (2013.01);
(Continued)

(58) Field of Classification Search
CPC ... Y10T 409/30392; Y10T 409/306832; Y10T 409/306888; Y10T 409/307224;
(Continued)

(56) References Cited

U.S. PATENT DOCUMENTS 3,754,487 A * 8/1973 Nachtigal ................ B23B 1/00
318/561
4,118,871 A * 10/1978 Kirkham ................ G01B 7/008
318/16
(Continued)

FOREIGN PATENT DOCUMENTS

DE 10163734 A1 * 7/2003 ......... B23Q 11/0057
DE 10-2008-008885 A1 8/2008
GB 2218208 A * 11/1989 ............. B23Q 17/10

OTHER PUBLICATIONS

International Search Report dated Jun. 2, 2016 issued in counterpart International (PCT) Application (No. PCT/IB2016/000033).
(Continued)

*Primary Examiner* — Daniel Howell
*Assistant Examiner* — Yasir Diab
(74) *Attorney, Agent, or Firm* — Womble Carlyle

(57) ABSTRACT

A machining center having at least one door to control access to an enclosure thereof, where access through the door is provided by an unlocked latch, and the latch is unlocked based on wirelessly communicated signals relaying information about at least one operating condition of a fluid driven cutting tool spindle in use within the machining center.

30 Claims, 10 Drawing Sheets

Related U.S. Application Data

(60) Provisional application No. 62/107,024, filed on Jan. 23, 2015.

(51) Int. Cl.
| | | |
|---|---|---|
| *B23Q 5/06* | (2006.01) | |
| *B23Q 17/00* | (2006.01) | |
| *B23Q 17/24* | (2006.01) | |
| B23Q 5/08 | (2006.01) | |
| B23Q 17/09 | (2006.01) | |
| B23Q 15/20 | (2006.01) | |

(52) U.S. Cl.
CPC ............. *B23Q 17/00* (2013.01); *B23Q 17/24* (2013.01); *B23Q 5/08* (2013.01); *B23Q 15/20* (2013.01); *B23Q 17/0904* (2013.01); *B23Q 2705/04* (2013.01); *B23Q 2717/006* (2013.01); *Y10T 408/14* (2015.01); *Y10T 408/16* (2015.01); *Y10T 408/65* (2015.01); *Y10T 408/6757* (2015.01); *Y10T 409/30392* (2015.01); *Y10T 409/30728* (2015.01); *Y10T 409/306832* (2015.01); *Y10T 409/306888* (2015.01); *Y10T 409/307224* (2015.01)

(58) Field of Classification Search
CPC ........... Y10T 409/30728; Y10T 408/14; Y10T 408/16; Y10T 408/165; Y10T 408/65; Y10T 408/6757; B23Q 2705/04; B23Q 15/20; B23Q 17/0904; B23Q 2717/006; B23Q 5/06; B23Q 5/08
See application file for complete search history.

(56) References Cited

U.S. PATENT DOCUMENTS

| | | | | |
|---|---|---|---|---|
| 4,784,539 A * | 11/1988 | Lehmkuhl | ......... | B23B 29/03457 33/505 |
| 5,020,968 A * | 6/1991 | Yamada | ................ | B23Q 17/10 318/400.22 |
| 5,065,035 A * | 11/1991 | Juengel | ................ | B23Q 1/0009 250/551 |
| 5,388,051 A * | 2/1995 | Seki | ...................... | G05B 19/408 700/169 |
| 5,428,548 A * | 6/1995 | Pilborough | ............ | B23Q 17/20 33/504 |
| 5,517,190 A * | 5/1996 | Gunn | ..................... | G01B 7/003 324/661 |
| 5,778,550 A * | 7/1998 | Carli | ...................... | B23Q 17/24 33/503 |
| 6,424,821 B1 * | 7/2002 | Komai | .................... | B23Q 11/00 340/693.5 |
| 6,874,980 B1 * | 4/2005 | Noelle | ..................... | B23Q 5/10 408/6 |
| 7,240,845 B2 * | 7/2007 | Komine | .................. | B23B 31/02 235/487 |
| 7,289,873 B2 * | 10/2007 | Redecker | ............. | B23Q 1/0009 307/104 |
| 7,568,867 B2 * | 8/2009 | Bryan | ...................... | B23Q 5/06 137/56 |
| 7,716,847 B2 * | 5/2010 | Eisenberger | ......... | G01B 21/047 33/558 |
| 8,316,742 B2 * | 11/2012 | Craig | ...................... | B23B 51/00 82/1.11 |
| 2002/0146295 A1 * | 10/2002 | Schaer | .................. | B23B 49/006 408/16 |
| 2003/0030565 A1 * | 2/2003 | Sakatani | ................ | G01H 1/003 340/679 |
| 2003/0103827 A1 * | 6/2003 | Moller | .................. | B23Q 1/0009 409/231 |
| 2004/0179915 A1 * | 9/2004 | Hill | ..................... | B23Q 17/0971 409/131 |
| 2008/0063483 A1 * | 3/2008 | Kawai | ................ | G05B 19/4015 409/208 |
| 2008/0195244 A1 * | 8/2008 | Jou | ........................ | B23Q 15/12 700/174 |
| 2009/0320820 A1 * | 12/2009 | Sinisi | ..................... | B23Q 11/08 125/30.01 |
| 2010/0145496 A1 * | 6/2010 | Tang | ..................... | B23Q 17/00 700/174 |
| 2011/0135415 A1 * | 6/2011 | Hamaguchi | ........ | B23Q 11/0032 409/79 |
| 2013/0322979 A1 * | 12/2013 | Koike | .................... | B23Q 1/015 409/206 |
| 2014/0080689 A1 | 3/2014 | Suzuki et al. | | |
| 2015/0367472 A1 | 12/2015 | Suzuki et al. | | |

OTHER PUBLICATIONS

Written Opinion dated Jun. 2, 2016 issued in counterpart International (PCT) Application (No. PCT/IB2016/000033).

\* cited by examiner

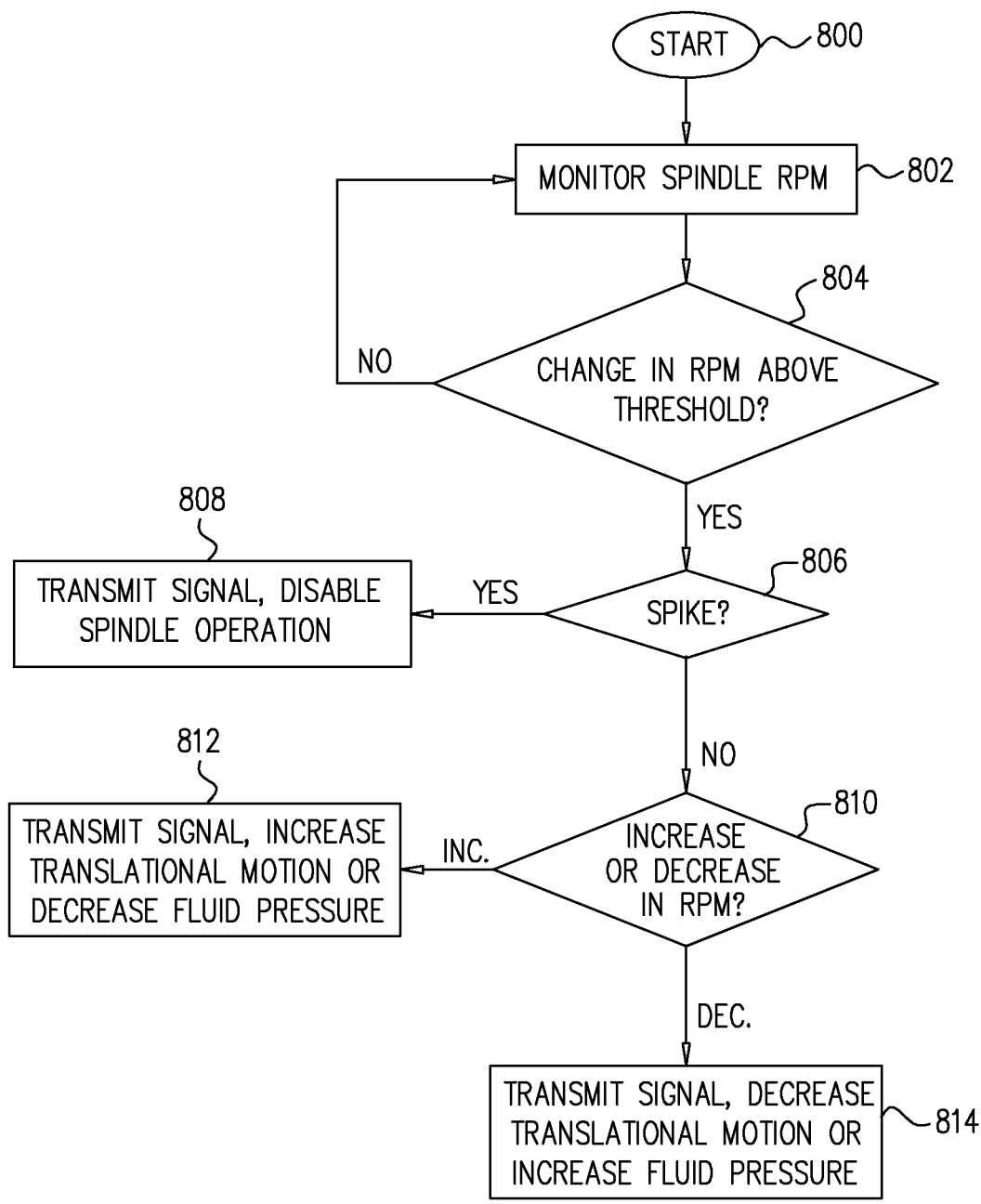

MACHINING CENTER, FLUID DRIVEN SPINDLE SYSTEM, MACHINING CENTER CONVERSION KIT, AND METHOD USING WIRELESS SENSOR FOR ACCESS CONTROL

RELATED APPLICATIONS

The present application is Bypass Continuation of PCT/IB2016/000033 filed Jan. 21, 2016 and published as WO 2016/116804A1 on Jul. 28, 2016, which claims priority to U.S. Provisional patent application No. 62/107,024, filed Jan. 23, 2015. The contents of the aforementioned applications are incorporated by reference in their entirety.

FIELD OF INVENTION

This disclosure relates to enclosed machining centers, and components thereof, with controlled access to, or operation of, the working tools inside.

BACKGROUND

Machining centers may seek validation that a cutting tool used within the machining center has stopped rotating before the operator is able to breach the machining center's enclosure. For example, some machining centers have doors that can only be opened when the cutting tool is no longer rotating.

Conventionally, a machine control system is wired to the cutting tool, in the form of an electric spindle, to power the tool. The machine control system also controls the accessibility of the enclosure. Therefore, when the electric spindle is receiving power, a door latch is closed. When the electric spindle is no longer receiving power, the latch can be disengaged and the door can be opened by an operator.

However, there can be a problem when operating spindles, linear axis, or live tools, which are not powered directly through the machine control system, because current machine control systems may be unable to sufficiently determine the tool's operating condition.

SUMMARY

The present disclosure seeks to improve communication of fluid driven high-speed spindles within machining centers by providing an ability for operating characteristics of fluid driven spindles to be monitored and the characteristics communicated to a machining center controller for use in adjusting operating characteristics of the machining center, such as the ability to access the machining center enclosure.

The present disclosure may be cast in the form of the following paragraphs:

Paragraph 1. A machining center having at least one door to control access to an enclosure thereof, the machining center comprising:

a latch having a locked position and an unlocked position to control an ability to open the at least one door;

a fluid driven cutting tool spindle, the fluid driven cutting tool spindle having a fluid driven shaft;

at least one sensor configured to monitor at least one operating condition of the fluid driven cutting tool spindle;

a wireless transmitter configured to receive sensor information from the at least one sensor, and transmit said sensor information;

a controller managing at least one processing condition of the machining center;

a wireless receiver in wireless communication with the wireless transmitter and in communication with at least one of the controller and the latch;

wherein, in response to sensor information received by the wireless receiver from the wireless transmitter, at least one function of the machining center is adjusted.

Paragraph 2. The machining center according to Paragraph 1, wherein latch position is managed by the controller.

Paragraph 3. The machining center according to Paragraph 1, wherein the at least one function is the latch position, adjusted when the at least one operating condition meets predetermined access criteria.

Paragraph 4. The machining center according to Paragraph 3, wherein the at least one operating condition includes the rotational speed of the shaft, and wherein the latch is in the locked position unless the access criteria is met, the access criteria providing a maximum allowable rotational speed.

Paragraph 5. The machining center according to Paragraph 3, wherein the at least one operating condition includes characteristics of the driving fluid, and wherein the at least one sensor monitors the magnitude of the fluid pressure used to rotate the shaft.

Paragraph 6. The machining center according to Paragraph 1, wherein the machining center further comprises a workpiece support; wherein, the at least one function is one of the processing conditions.

Paragraph 7. The machining center according to Paragraph 6, wherein the operating condition is the rotational speed of the shaft, and the processing condition is a relative translational speed between the fluid driven cutting tool spindle and the workpiece support.

Paragraph 8. The machining center according to Paragraph 6, wherein the operating condition is the rotational speed of the shaft and the processing condition is a characteristic of the driving fluid.

Paragraph 9. The machining center according to Paragraph 1, wherein the at least one operating condition includes the rotational speed of the shaft, and wherein the latch is in the locked position unless the at least one sensor indicates that the shaft is at rest.

Paragraph 10. The machining center according to Paragraph 1, wherein the at least one operating condition includes the rotational speed of the shaft, and wherein the latch is in the locked position unless the access criteria is met, the access criteria providing a maximum allowable rotational speed.

Paragraph 11. The machining center according to Paragraph 1, wherein the at least one sensor is a non-contact optical sensor.

Paragraph 12. The machining center according to Paragraph 1, wherein the at least one sensor is an electromagnetic sensor.

Paragraph 13. The machining center according to Paragraph 1, wherein the at least one operating condition includes characteristics of the fluid, and wherein the at least one sensor monitors the magnitude of the fluid pressure used to rotate the shaft.

Paragraph 14. The machining center according to Paragraph 1, wherein the at least one operating condition includes translational motion of the fluid driven cutting tool spindle, and wherein the at least one sensor comprises an accelerometer.

Paragraph 15. The machining center according to Paragraph 1, wherein the at least one sensor comprises a plurality of sensors, and wherein the latch is in the unlocked position when all of the plurality of sensors sense the operating conditions meeting the access criteria.

Paragraph 16. The machining center according to Paragraph 1, wherein the machining center further comprises a machine spindle, a workpiece support and a controller, the controller managing at least one managed parameter, the managed parameters comprising translational motion of at least one of the machine spindle and the workpiece support, or a property of the fluid driving the cutting tool spindle;

wherein the fluid driven cutting tool spindle is mounted within the machine spindle;

wherein the at least one sensor monitors the rotational speed of the shaft as the at least one operating condition;

wherein the wireless receiver is in communication with the controller; and wherein the controller adjusts at least one of the managed parameters in response to changes in rotational speed of the shaft.

Paragraph 17. A machining center, comprising:

a machine spindle;

a workpiece support;

a fluid driven cutting tool spindle, the fluid driven cutting tool spindle having a fluid driven shaft and being mounted to the machine spindle;

at least one sensor monitoring rotational speed of the shaft;

a controller managing at least one managed parameter, the managed parameters comprising translational motion of at least one of the machine spindle and the workpiece support, or a property of the fluid driving the cutting tool spindle;

a wireless transmitter in communication with the at least one sensor;

a wireless receiver in communication with the wireless transmitter and the controller, wherein the controller adjusts at least one of the managed parameters in response to changes in rotational speed of the shaft.

Paragraph 18. The machining center according to Paragraph 17, wherein the machining center further comprises a door and a latch, the latch having a locked position and an unlocked to control an ability to open the door; wherein the wireless receiver is in operable communication with the latch, wherein the position of the latch corresponds to whether or not the rotational speed meets predetermined access criteria.

Paragraph 19. A method of controlling a machining center comprising an enclosure, at least one door, a latch for locking and unlocking the at least one door, and a fluid driven cutting tool spindle mounted within the enclosure, the method comprising:

providing at least one sensor module configured to monitor the fluid driven cutting tool spindle, the at least one sensor module comprising at least one sensor operatively coupled to a wireless transmitter;

driving a shaft of the fluid driven cutting tool spindle with a high pressure fluid;

monitoring, with the at least one sensor, at least one operating condition of the fluid driven cutting tool spindle;

wirelessly transmitting the at least one operating condition to a wireless receiver; and adjusting at least one function of the machining center in response to said at least one operating condition received by the wireless receiver.

Paragraph 20. The method according to Paragraph 19, wherein the latch is in communication with the wireless receiver, wherein the method further comprises:

locking the at least one door during the step of driving the shaft; and the step of adjusting at least one function comprises unlocking the at least one door when the wireless receiver indicates that the monitored operating condition meets predetermined access criteria.

Paragraph 21. The method according to Paragraph 19, wherein the at least one operating condition is the rotational speed of the shaft, the method further comprising:

translating the machine spindle relative to a workpiece; and the step of adjusting at least one function comprises adjusting the relative speed of translation when the monitored operating condition indicates that the rotational speed is changing.

Paragraph 22. The method according to Paragraph 19, wherein the at least one operating condition is the rotational speed of the shaft, and the step of adjusting at least one function comprises increasing a pressure of fluid driving the fluid driven cutting tool spindle when the rotational speed is decreasing.

Paragraph 23. The method according to Paragraph 19, wherein the at least one operating condition is the rotational speed of the shaft, and the step of adjusting at least one function comprises terminating the driving step when the rotational speed spikes.

Paragraph 24. A method of controlling a machining center comprising an enclosure, at least one door, and a fluid driven cutting tool spindle mounted within the enclosure, the method comprising:

providing at least one sensor module configured to monitor the fluid driven cutting tool spindle, the at least one sensor module comprising at least one sensor operatively coupled to a wireless transmitter;

driving a shaft of the fluid driven cutting tool spindle with a high pressure fluid;

monitoring, with the at least one sensor, at least one operating condition of the fluid driven cutting tool spindle;

wirelessly transmitting the at least one operating condition to a wireless receiver; and adjusting at least one function of the machining center in response to said at least one operating condition received by the wireless receiver.

Paragraph 25. The method according to Paragraph 24, wherein the machining center further comprises a latch, for locking and unlocking the at least one door, in communication with the wireless receiver, wherein the method further comprises:

locking the at least one door during the step of driving the shaft; and unlocking the at least one door when the wireless receiver indicates that the monitored operating condition meets predetermined access criteria.

Paragraph 26. The method according to Paragraph 25, wherein the at least one operating condition is a rotational speed of the shaft.

Paragraph 27. The method according to Paragraph 25, wherein the at least one operating condition includes relative pressure of the fluid.

Paragraph 28. The method according to Paragraph 25, wherein the at least one operating condition includes translational motion of the fluid driven cutting tool spindle.

Paragraph 29. The method according to Paragraph 25, wherein monitoring at least one operating condition comprises monitoring a plurality of operating conditions using a plurality of sensors; and wherein unlocking occurs when each of the plurality of sensors senses an operating condition meeting predetermined access criteria.

Paragraph 30. The method according to Paragraph 24, wherein that at least one operating condition is the rotational speed of the shaft, the method further comprising:

translating the machine spindle to process a workpiece; and adjusting the speed of translation when the monitored operating condition indicates that the rotational speed is changing.

Paragraph 31. The method according to Paragraph 24, wherein the at least one operating condition is the rotational speed of the shaft, the method further comprising:

increasing a pressure of fluid driving the fluid driven cutting tool spindle when the rotational speed is decreasing.

Paragraph 32. The method according to Paragraph 24, wherein the at least one operating condition is the rotational speed of the shaft, the method further comprising:

terminating the driving step when the rotational speed spikes.

Paragraph 33. A machining center conversion kit for installation with a machining center, the machining center having at least one door to control access to an enclosure thereof, a machine center controller for operating the machining center, and a fluid driven spindle having a rotatable shaft operably disposed within the enclosure, the kit comprising:

a wireless sensor module capable of monitoring at least one operating condition of the fluid driven spindle, the wireless sensor module including at least one sensor and a wireless transmitter;

a wireless receiver capable of receiving signals sent from the wireless transmitter of the sensor module; and a controller connector for operably connecting the wireless receiver to the machining center controller, wherein the kit is configured to relay information, corresponding to the at least one operating condition, to the machine center controller in a format usable by the machine center controller for controlling access to the enclosure based upon predetermined access criteria.

Paragraph 34. The machining center conversion kit according to Paragraph 33, wherein the kit is configured to relay the information in the usable format using software stored on a computer readable medium incorporated within the machine center controller.

Paragraph 35. The machining center conversion kit according to Paragraph 33, wherein the kit is configured to relay the information in the usable format using software stored on a computer readable medium housed within the wireless sensor module.

Paragraph 36. The machining center conversion kit according to Paragraph 33, wherein the kit is configured to relay the information in the usable format using software stored on a computer readable medium housed within a unit comprising the wireless receiver.

Paragraph 37. The machining center conversion kit according to Paragraph 33, wherein the at least one operating condition includes the rotational speed of the shaft.

Paragraph 38. The machining center conversion kit according to Paragraph 33, wherein the at least one sensor is a non-contact optical sensor.

Paragraph 39. The machining center conversion kit according to Paragraph 33, wherein the at least one sensor is an electromagnetic sensor.

Paragraph 40. The machining center conversion kit according to Paragraph 33, wherein the at least one operating condition includes characteristics of a fluid configured to drive the fluid driven spindle, and wherein the at least one sensor monitors the magnitude of the fluid pressure used to rotate the shaft.

Paragraph 41. The machining center conversion kit according to Paragraph 33, wherein the at least one operating condition includes translational motion of the fluid driven spindle, and wherein the at least one sensor comprises an accelerometer.

Paragraph 42. The machining center conversion kit according to Paragraph 33, wherein the at least one sensor comprises a plurality of sensors, and wherein a latch locking the door is in the unlocked position when each of the plurality of sensors senses the operating conditions meeting predetermined access criteria.

Paragraph 43. The machining center conversion kit according to Paragraph 33, wherein the information enables the at least one operating condition monitored by the at least one sensor to influence adjustment of the speed of translational motion of the fluid driven spindle in response to changes in rotational speed of the shaft sensed by the wireless sensor module.

Paragraph 44. The machining center conversion kit according to Paragraph 33, wherein a data signal with the information sent from the at least one sensor via the wireless transmitter to the wireless receiver is directly usable by the machine center controller.

Paragraph 45. The machining center conversion kit according to Paragraph 33, wherein a software product converts a data signal containing the information, received by the wireless receiver, to be usable by the machine center controller.

Paragraph 46. The machining center conversion kit according to Paragraph 33, wherein a software product converts a data signal containing the information, received through the controller connector to be usable by the machine center controller.

Paragraph 47. A machining center conversion kit for installation with a machining center, the machining center having at least one door to control access to an enclosure thereof, a machine center controller for operating the machining center, and a fluid driven spindle with at least a wireless sensor operably disposed within the enclosure, the wireless sensor monitoring at least one operating condition of the fluid driven spindle, the kit comprising:

a controller connector for operably coupling the wireless sensor to the machine center controller, wherein the controller connector is configured to relay information, corresponding to the at least one operating condition, to the machine center controller in a format usable by the machine center controller for controlling access to the enclosure based upon predetermined access criteria.

Paragraph 48. The machining center conversion kit according to Paragraph 47, wherein the kit includes a software product that converts a data signal containing the information, received through the controller connector to allow the machine center controller to determine accessibility of the enclosure.

Paragraph 49. A fluid driven high-speed spindle system for installation within a machining center, the machining center having at least one door with a latch to control access to an enclosure thereof, and a machine center controller for operating the machining center, the system comprising:

a spindle having a shaft that is capable of being rotated by pressurized fluid;

a wireless sensor module capable of monitoring at least one operating condition of the spindle, the wireless sensor module including at least one sensor and a wireless transmitter;

a wireless receiver capable of receiving signals sent from the wireless transmitter of the sensor module; and a controller connector for operably connecting the wireless receiver to the machining center controller, wherein the controller connector is configured to relay information, corresponding to the at least one operating condition, to the machine center controller in a format usable by the machine center controller for adjusting at least one function of the machining center in response to said at least one operating condition received by the wireless receiver.

Paragraph 50. The spindle system according to Paragraph 49, wherein adjust at least one function comprises controlling access to the enclosure based upon predetermined access criteria.

Paragraph 51. A fluid driven high-speed spindle system for installation within a machining center, the machining center having at least one door to control access to an enclosure thereof, and a machine center controller for operating the machining center, the system comprising:

a spindle having a shaft that is capable of being rotated by pressurized fluid;

a wireless sensor module capable of monitoring at least one operating condition of the spindle, the wireless sensor module including at least one sensor and a wireless transmitter;

a wireless receiver capable of receiving signals sent from the wireless transmitter of the sensor module; and a controller connector for operably connecting the wireless receiver to the machining center controller, wherein the controller connector is configured to relay information, corresponding to the at least one operating condition, to the machine center controller in a format usable by the machine center controller for controlling access to the enclosure based upon predetermined access criteria.

Paragraph 52. The spindle system according to Paragraph 51, wherein the controller connector is configured to relay the information in the usable format using software stored on a computer readable medium incorporated within the machine center controller.

Paragraph 53. The spindle system according to Paragraph 51, wherein the controller connector is configured to relay the information in the usable format using software stored on a computer readable medium housed within the wireless sensor module.

Paragraph 54. The spindle system according to Paragraph 51, wherein the controller connector is configured to relay the information in the usable format using software stored on a computer readable medium within a unit comprising the wireless receiver.

Paragraph 55. The spindle system according to Paragraph 51, wherein the at least one operating condition includes the rotational speed of the shaft.

Paragraph 56. The spindle system according to Paragraph 51, wherein the at least one sensor is a non-contact optical sensor.

Paragraph 57. The spindle system according to Paragraph 51, wherein the at least one sensor is an electromagnetic sensor.

Paragraph 58. The spindle system according to Paragraph 51, wherein the at least one operating condition includes characteristics of a fluid configured to drive the spindle, and wherein the at least one sensor monitors the magnitude of the fluid pressure used to rotate the shaft.

Paragraph 59. The spindle system according to Paragraph 51, wherein the at least one operating condition includes translational motion of the spindle, and wherein the at least one sensor comprises an accelerometer.

Paragraph 60. The spindle system according to Paragraph 51, wherein the at least one sensor comprises a plurality of sensors, and wherein a latch locking the door is in the unlocked position when each of the plurality of sensors senses the operating conditions meeting predetermined access criteria.

Paragraph 61. The spindle system according to Paragraph 51, wherein the information enables the at least one operating condition monitored by the at least one sensor to influence adjustment of the speed of translational motion of the fluid driven spindle in response to changes in rotational speed of the shaft sensed by the wireless sensor module.

Paragraph 62. The spindle system according to Paragraph 51, wherein a data signal with the information sent from the at least one sensor via the wireless transmitter to the wireless receiver is directly usable by the machine center controller.

Paragraph 63. The spindle system according to Paragraph 51, wherein a software product converts a data signal containing the information, received by the wireless receiver, to be usable by the machine center controller.

Paragraph 64. The spindle system according to Paragraph 51, wherein a software product converts a data signal containing the information, received through the controller connector, to be usable by the machine center controller.

BRIEF SUMMARY OF THE DRAWINGS

FIG. 8 shows a flow chart according to some spindle monitoring embodiments of the machining center of the present disclosure.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

In some cases, fluid driven cutting tool spindles are replacing the use of electric spindles. The fluid driven cutting tool spindles may be capable of providing higher rotational speeds and are sometimes referred to as high-speed spindles.

Figure 1A:
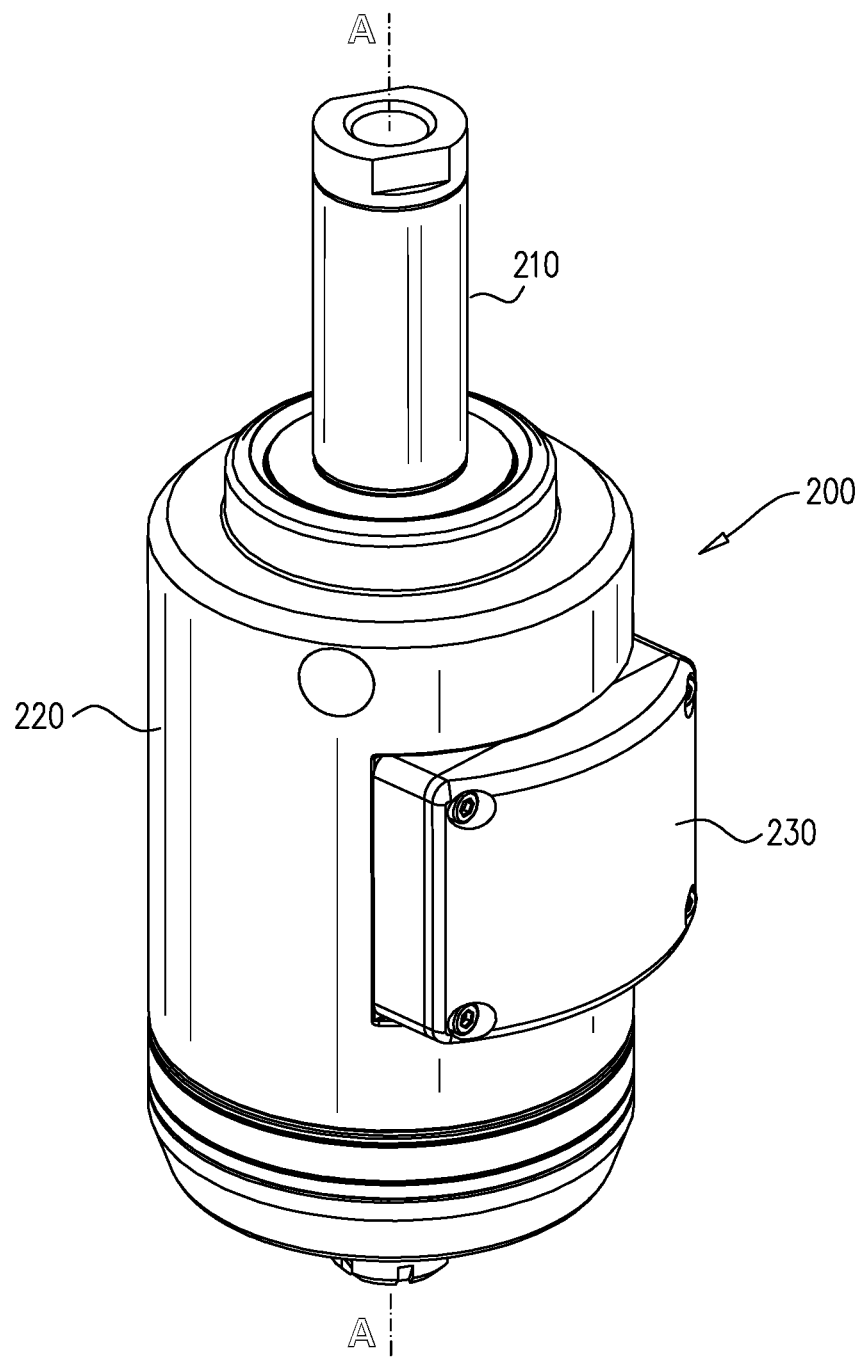
FIGS. 1A and 1B show an example of a fluid driven cutting tool spindle usable with machining centers disclosed.
Figure 1B:
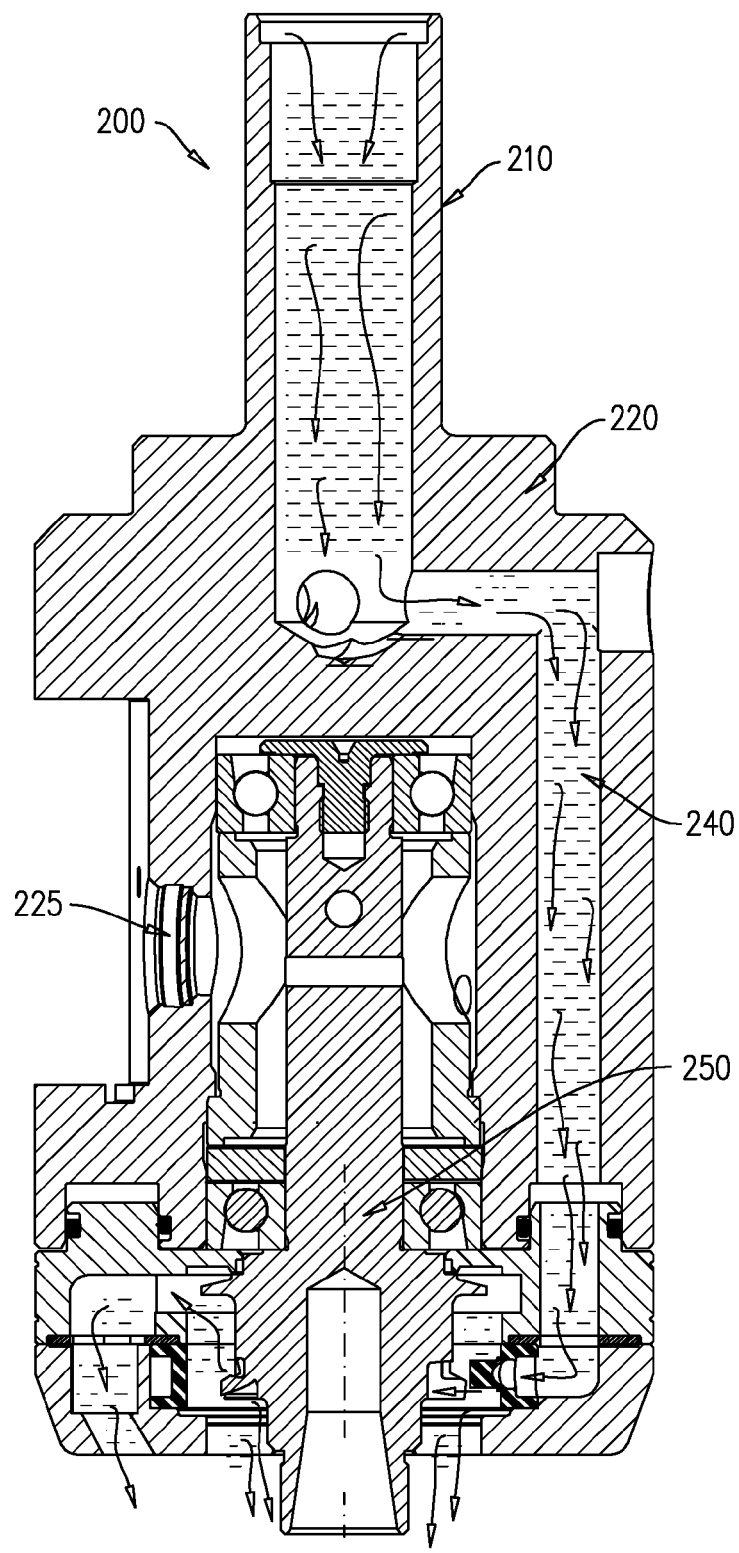

FIGS. 1A and 1B show an example of a fluid driven cutting tool spindle 200 that may be compatible with machining centers described in this disclosure. The fluid driven cutting tool spindle 200 of this disclosure may be driven by liquid or gas passing through the spindle's housing at relatively high pressures. The fluid driven cutting tool spindle 200 of FIGS. 1A and 1B is similar to high speed spindles described in related, jointly owned, U.S. application Ser. No. 14/461,006 filed on Aug. 15, 2014, which is incorporated herein in its entirety.

As seen in FIG. 1A, the fluid driven cutting tool spindle 200 includes a shank 210, a housing 220 and a sensor module 230 mounted to the housing 220. As seen in FIG. 1B, the shank 210 and the housing 220 define a fluid channel 240. Fluid exiting the fluid channel 240 may act upon a shaft 250 to rotate the shaft 250 around a rotation axis A shown in FIG. 1A. A cutting insert 130 (see FIG. 4) may be mounted to the end of the shaft 250 for synchronous rotation therewith.

The housing 220 may have an opening 225 to provide a generally unobstructed path between the sensor module 230 and the shaft 250. In some embodiments, the opening 225 may be physically obstructed but substantially transparent to specific frequencies of the electromagnetic spectrum.

Figure 2A:
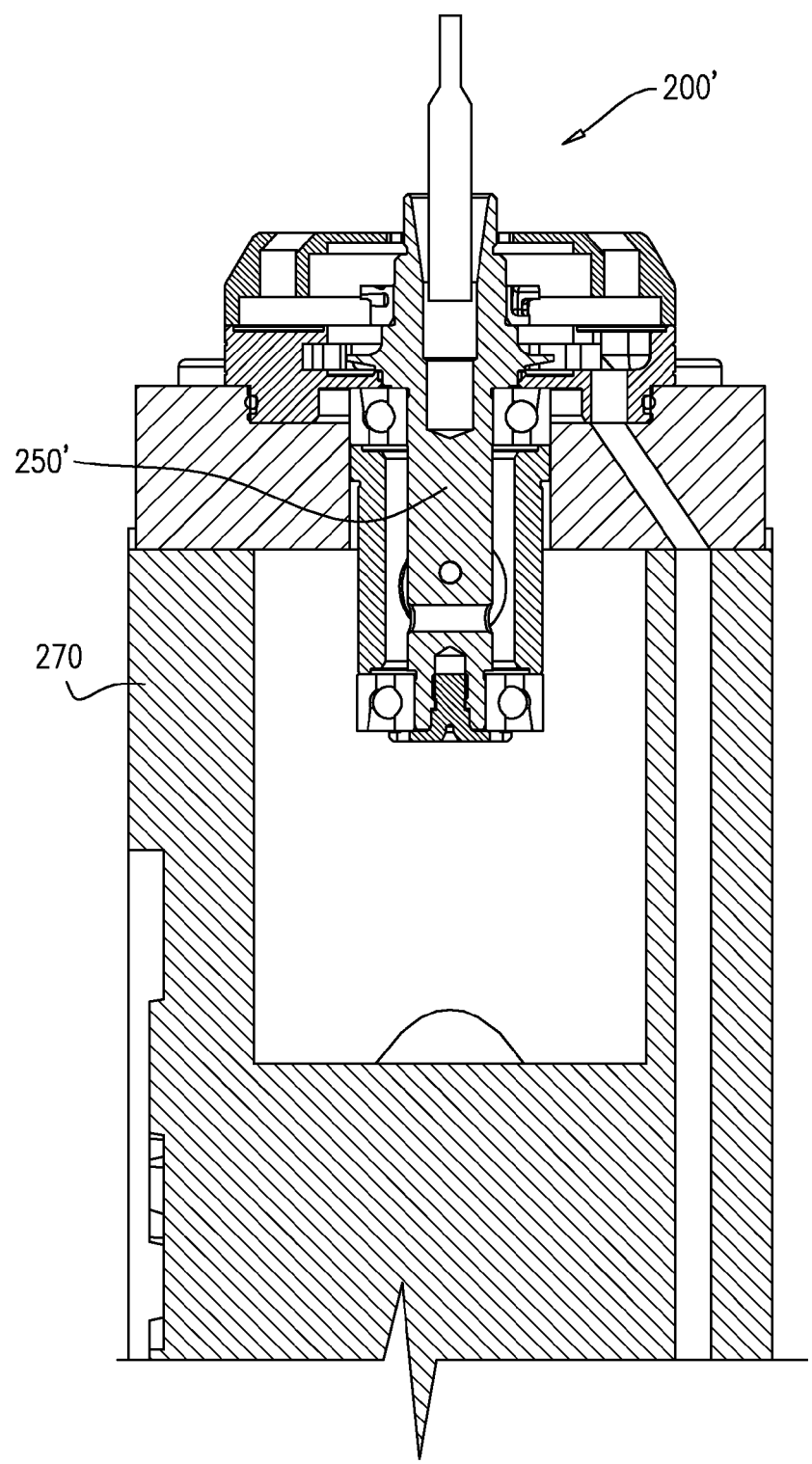
FIG. 2A shows a second example of a fluid driven cutting tool spindle usable with machining centers disclosed.
Figure 2B:
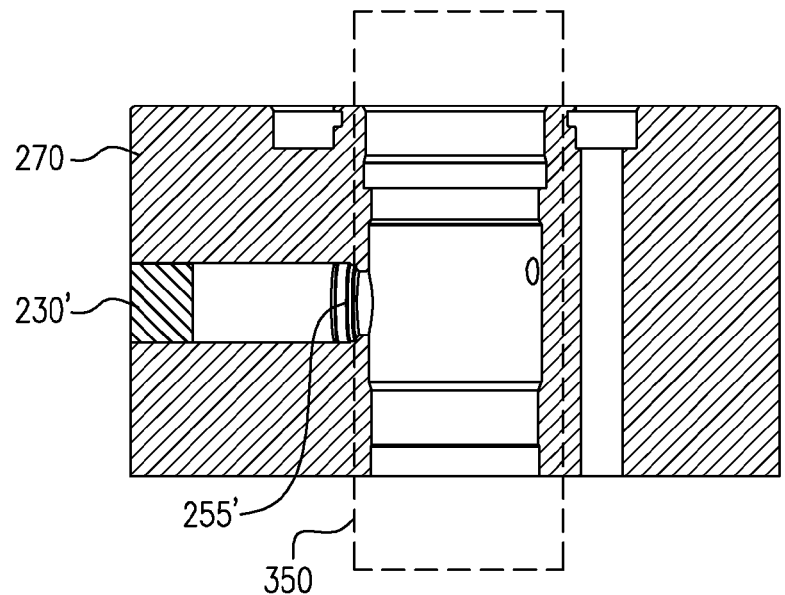
FIG. 2B shows a detailed view of FIG. 2A according to one embodiment thereof.
Figure 2C:
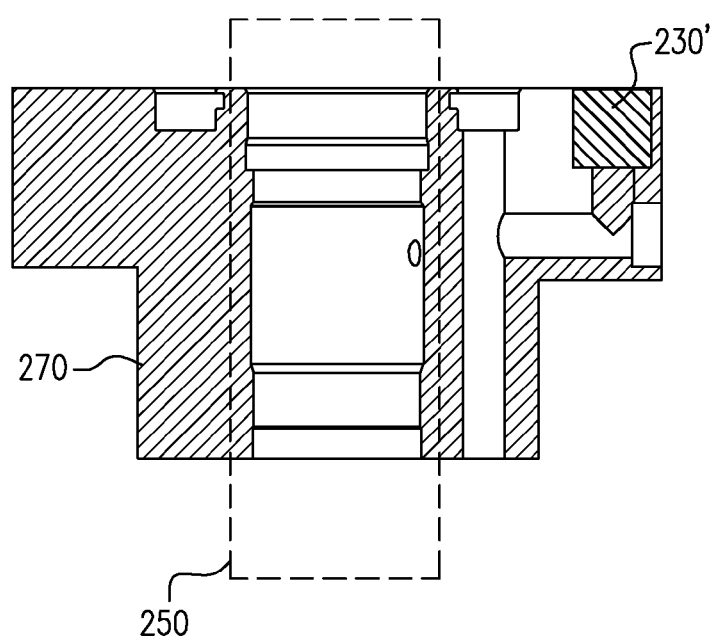
FIG. 2C shows a detailed view of FIG. 2A according to a second embodiment thereof.

FIG. 2A shows an alternative fluid driven cutting tool spindle 200'. The fluid driven cutting tool spindle 200' may be mounted in a monoblock 270 of a tool turret. The monoblock 270 provides the fluid and passages for powering the shaft 250' instead of requiring a specific spindle housing. As shown in FIG. 2B the monoblock 270 may also have an opening 225' and an associated sensor module 230'. In other embodiments, as shown in FIG. 2C, the sensor module 230' indirectly assesses spindle characteristics by monitoring fluid characteristics passing through the monoblock without an opening into the shaft.

The present disclosure should not be limited to the fluid driven spindles 200, 200' disclosed above. Other configurations of fluid driven spindles 200 may also be suitable for the present disclosure. For example, the driving fluid may be channeled through the shaft of the spindle instead of the housing or the monoblock.

Figure 3:
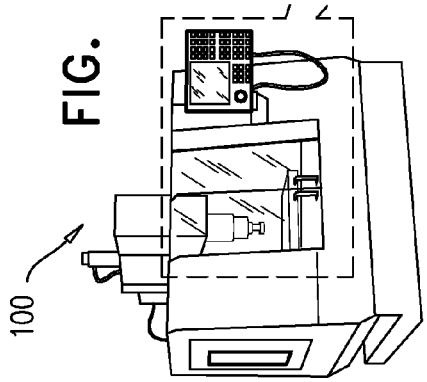
FIG. 3 shows a machining center according to some embodiments of the present disclosure.
Figure 3:
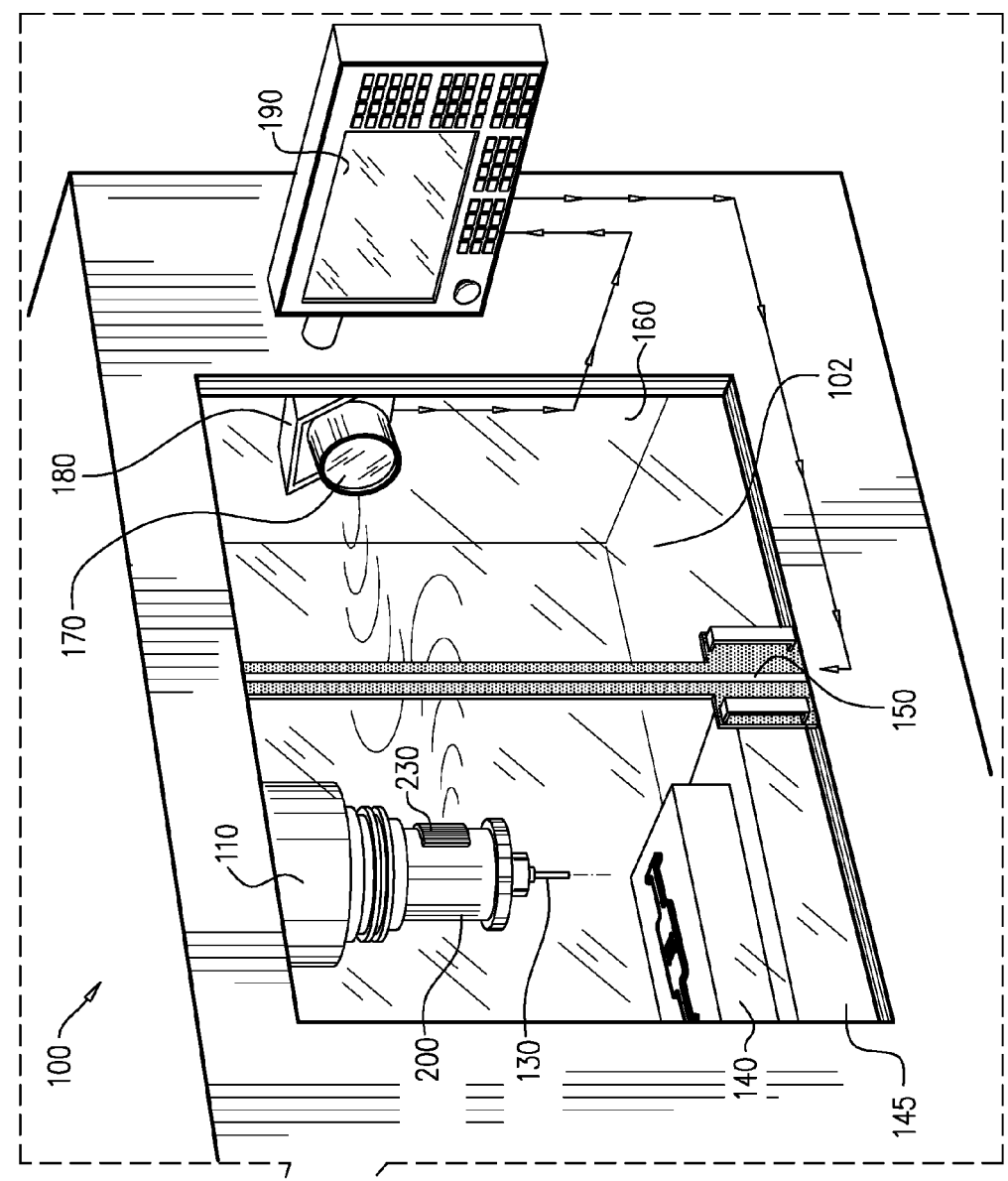

FIG. 3 shows a machining center 100. Machining centers within the scope of this disclosure include milling or turning centers, automatic, CNC, semi-automatic or manual stations. In this non-limiting example, a fluid driven cutting tool spindle 200 is mounted within a machine spindle 110 that is disposed within the machining center 100. The fluid driven cutting tool spindle 200 supports a cutting insert 130. The machine spindle 110, fluid driven cutting tool spindle 200, cutting insert 130, and a workpiece 140 are housed within an enclosure 102 of the machining center 100. The workpiece 140 may sit upon or be held by a workpiece support 145 that may be movable. The enclosure 102 may be accessed through at least one door 160. The at least one door 160 includes a selectively engaged latch 150 that is capable of locking the door 160 in a closed position.

As used herein, the term door refers to any means by which at least the primary opening of the machining center is closed. The primary opening of the machining center is the opening through which the workpiece is inserted and removed from the machining center. The door may be hinged, folding, sliding or any other means known in the art. The door may include a single pane or multiple panes. The door may be operated manually or automatically. The door may have at least one handle or other manipulation means known in the art.

In a conventional system, a machine control system operates the machine spindle 110 and the latch 150 in a wired configuration. When operating, the machine spindle is electrically powered to rotate, therefore turning the cutting insert 130. The machine control system controls the current to the machine spindle 110 that causes rotation, and when current is no longer being supplied to the machine spindle, the machine control system can disengage the latch 150. This wired communication between the machine spindle 110 and the machine control system may utilize an encoder to provide a signal that triggers engagement and disengagement of the latch 150.

However, the housing of the fluid driven cutting tool spindle 200 is intended to remain substantially rotationally stationary as fluid is run through the fluid driven cutting tool spindle 200 to rotate the cutting insert 130 with the driven shaft. Under this configuration, a conventional machine control system can be deprived of its ability to determine the active operation of the machine spindle 110 that would otherwise trigger the unlocking of the latch 150.

Figure 5:
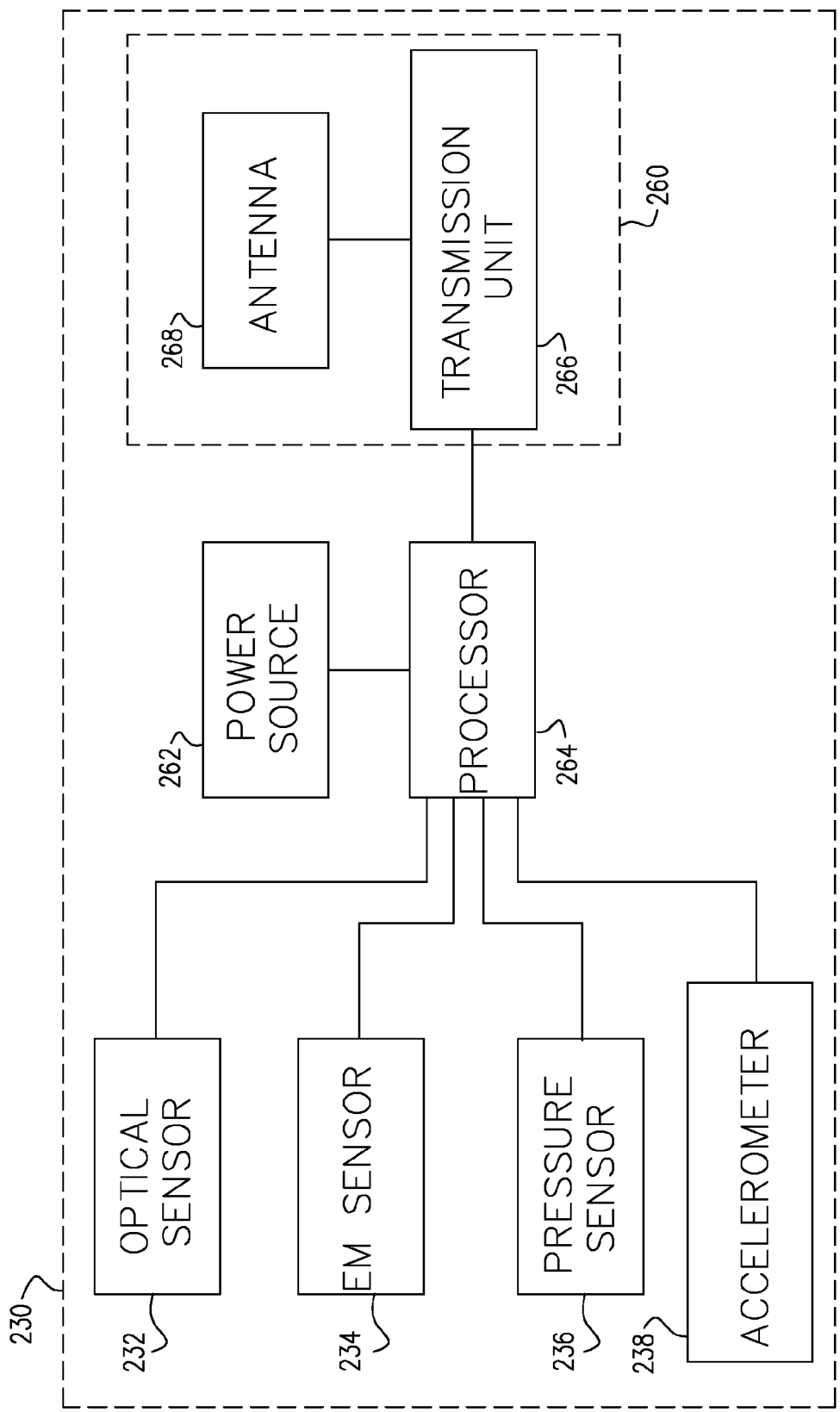
FIG. 5 shows a schematic representation of a sensor module according to embodiments of the present disclosure.

To help cure this potential problem, inventors have provided a sensor module 230 (see FIG. 5) mounted to, mounted on, embedded within, or operably arranged relative to the fluid driven cutting tool spindle 200 or the support structure, such as monoblock 270, thereof. The sensor module 230 monitors one or more operating conditions of the fluid driven cutting tool spindle 200. Operating conditions can include, but are not limited to, rotational speed of the shaft 250, rotational speed of the cutting insert 130, characteristics of fluid flow, such as pressure or flow rate, translational speed or acceleration of the housing 220, or relative position, speed or acceleration of the fluid driven cutting tool spindle 200 relative to the workpiece 140 or the workpiece support 145. Changes in operating conditions of the fluid driven cutting tool spindle 200 should lead to adjustment in one or more functions of the machining center. Functions of the machining center include, but are not limited to, allow and baring access to the enclosure, driving the shaft 250 of the fluid driven spindle 200, and processing a workpiece by contacting the cutting insert 130 with a workpiece and providing relative translational motion therebetween. Some but not all of these functions may be controlled, managed or adjusted via the machining center controller 190. In some embodiments, the machining center controller 190 is an internal controller, or includes multiple components located on or within the machining center 100. Those functions controlled by the machining center controller may be referred to as processing conditions. Therefore processing conditions relate at least to the conditions under which a workpiece is processes, such as the relative motion of the workpiece relative to the cutting insert 130, or the fluid characteristics used to drive the shaft 250.

In some embodiments, the sensor module 230 may directly monitor the rotational speed of the shaft 250 through the opening 225. For example, the sensor module 230 may include non-contact motion sensors such as an optical sensor 232 capable of sensing rotational speed by monitoring of a visual mark located on the shaft 250, where the mark periodically sweeps through the vision of the optical sensor 232. The optical sensor 232 may use any known optical technology, such as visible light, laser, infra-red light, or ultraviolet light.

Alternatively or additionally, the sensor module 230 may include sensors based on electromechanical, magnetic, optical, magnetoelastic, or field-effect technologies, such as an electromagnetic sensor 234 capable of sensing rotational speed by monitoring the frequency resulting from a magnetic marker placed upon the shaft 250 as the magnetic marker rotates past the electromagnetic sensor 234. In some embodiments, non-contact motion sensors within the sensor module 230 may use microwave technology.

Alternatively or additionally, the sensor module 230 may include a pressure sensor 236 (see FIG. 5) in fluid communication with the fluid channel 240 (see FIG. 1B) or other path of driving fluid. The pressure sensor 236 may monitor the magnitude of the fluid pressure running through the fluid channel 240. A fluid sensor that reads low, or zero, relative fluid pressure may infer a low or zero rotational speed for the shaft 250. Thus the sensor module 230 with a pressure sensor 236 would indirectly determine the approximate rotational speed of the shaft 250 and the cutting insert 130. In other embodiments other fluid sensors may be used that operate based on related characteristics such as flow rate. As understood from the preceding, in some embodiments, more than one type of sensor may be used to monitor separate operating conditions of the fluid driven cutting tool spindle 200.

In some embodiments, the fluid driven cutting tool spindle 200 is at rest when the shaft speed, as sensed by the sensor module 230, is approximately zero RPM. In some embodiments, the sensor module 230 includes a wireless transmitter 260 (see FIG. 5). The wireless transmitter 260 may transmit a signal, indicative of sensor information received from a sensor, when the shaft 250 is at rest, i.e. zero RPM, or below some other predetermined, relatively slow, RPM. In other embodiments, the wireless transmitter 260 may substantially continuously, repeatedly or periodically transmit a signal that may directly or indirectly communicate the rotational speed of the shaft 250, or other information concerning other operating conditions of the fluid driven cutting tool spindle 200.

The sensor module 230 may use the wireless transmitter 260 to communicate wirelessly with a wireless receiver 170. The sensor module 230 may include a power source 262, such as a battery, or provide power to the sensors 232, 234, 236 and the wireless transmitter 260 of the sensor module 230 through an optional processor 264. The optional processor 264 may allow the necessary calculations concerning operating conditions to be computed by the sensor module 230. In other embodiments, the sensor module 230 transmits the rare data (e.g. a frequency) for interpretation by the machining center controller 190 or a processor associated with the wireless receiver 170. The wireless transmitter 260 may include a RF transmission unit 266 and an antenna 268.

In some embodiments, the wireless receiver 170 is connected to a fixture 180 that may be mounted within the enclosure 102 of the machining center 100. In some embodiments there is a direct line of sight between the sensor module 230 and wireless receiver 170. In other embodiments, wireless receiver 170 accepts signals transmitted from the sensor module 230 that are reflected from a surface within the enclosure 102 of the machining center 100.

The wireless receiver 170 is operably connected to the machining center controller 190 by a controller connector (discussed below) such that signals received by the wireless receiver 170 can be used by the machining center controller 190. In other words, the controller connector may relay information from the wireless receiver to the machining center controller. In some embodiments, once the machining center controller 190 processes the signal, it can communicate with the at least one latch 150, which secures the at least one door 160, in a conventional fashion to allow for accessing the enclosure 102. In other embodiments, the signal does not have to be processed by the machining center controller 190 because the signal is provided in a format already recognized by the machining center controller 190.

Figure 4:
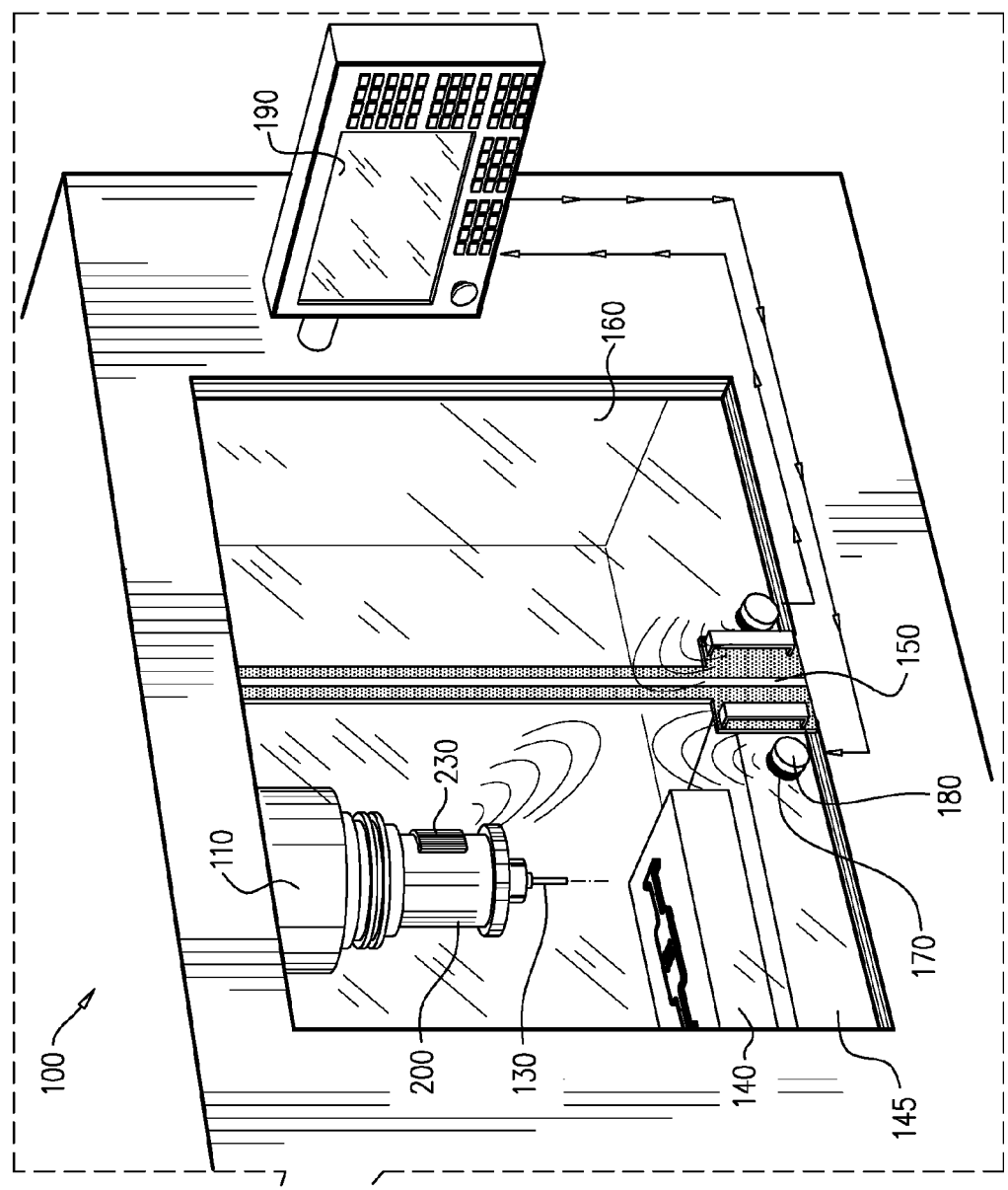
FIG. 4 shows a machining center according to some other embodiments of the present disclosure.
Figure 4:
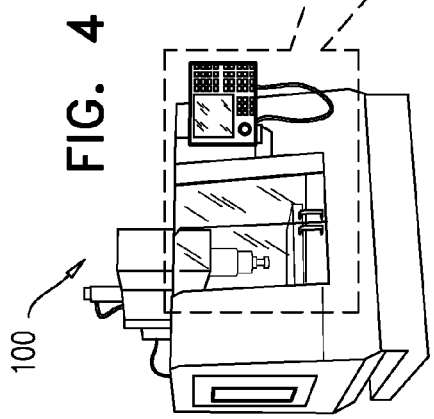

FIG. 4 shows an alternative embodiment for selectively allowing access to the machining center's enclosure 102. In the embodiment of FIG. 4, the wireless transmitter 260 of the sensor module 230 communicates wirelessly with the wireless receiver 170 that is in operational communication with the at least one latch 150 without relying upon the machining center controller 190. In some embodiments, the wireless receiver 170 is connected to the fixture 180 mounted on the door 160. In other embodiments, the fixture 180 may be mounted or incorporated with the latch 150. In still other embodiments, the wireless receiver 170 may itself be mounted to or integrated within the latch 150.

The operating principles of the machining center 100 may necessitate that the door latch 150 should be engaged, i.e. the latch provided in a locked position and unable to be opened, at all times that the machining center 100 is powered on, unless the sensor module 230 indicates that the operating condition of the shaft 250 meets a related access criteria. In one embodiment, where the operating condition is the rotational speed of the shaft 250, the access criteria could be that the shaft 250 is at rest, or rotating at an otherwise acceptably low speed below a minimum threshold.

In some embodiments, the sensor module 230 may monitor motions of multiple axes instead of, or in addition to, rotation of the shaft 250. For example, the sensor module 230 may include an accelerometer 238. In instances where the machine spindle 110 is capable of movement along the rotation axis A, or movement of the rotation axis A in space, the accelerometer 238 could sense these motions and transmit appropriate signals to prevent access into the enclosure 102 while parts are in motion.

In some embodiments additional motion sensors may be provided within the sensor module 230, or separate therefrom in order to monitor motion of other potentially movable elements within the enclosure. Examples of other movable elements that may be within the enclosure include: moving components of the workpiece support 145, moving components of measurement systems, moving components of auxiliary systems such as material handling systems, moving components of material removal systems such as metal shavings, cutting fluids etc. In each of the above examples, the same principle applies: the door latch 150 remains engaged to lock the door 160 at all times that the machine power is on, unless the plurality of motion sensors and sensor modules indicate that the access criteria for all of the axes is met, at which time, the door latch 150 can be disengaged and the door 160 can be opened.

In some embodiments, the access criteria may be set to allow access to the enclosure 102 if internal elements are moving with some speed below a minimum threshold, such as a minimum 10, 30 or 100 RPM of the shaft 250 or a minimum speed of 200, 500 or 1000 mm/min along any axis of motion for any moving component.

In some embodiments, the machining center 100 may include more than one door 160. One or more latches 150 may operate to lock the free ends of each door 160 with respect to one another. In other words each latch 150 may simultaneously lock the two doors 160 shown in FIGS. 3 and 4. The latches 150 may include a mechanical or an electro mechanical element that, when applied, can lock the machining center door and may also include an actuator that can change the element state such that the machining center door can be opened.

According to some embodiments related to FIG. 3, the communication between the wireless transmitter 260 and the wireless receiver 170 of the machining center controller 190 may allow for control of parameters beyond the locking and unlocking of the latch 150. For example, the wireless transmitter 260 may provide signals sufficient for the machining center controller 190 to substantially continuously monitor rotational speed of the shaft 250, and changes in rotational speed thereof, due to the material removal process. The shaft 250 is understood to be rotating at the same speed as a cutting insert 130 held therein. Therefore monitoring the shaft 250 can provide information about the operation of the cutting insert 130. Additionally, the cutting insert 130 could be monitored to provide information about the operation of the shaft 250. The rotational speed can be affected by numerous variables, such as cutting depth, tool sharpness, material hardness, tool breakage, and others.

While the machining center controller 190 indirectly drives the shaft 250 to rotate via the fluid pressure, the machining center controller 190 may control relative translational movement of the cutting insert 130 by moving the machine spindle 110 or the workpiece 140 via the workpiece support 145. It therefore may be beneficial to link the rate of translational motion imparted electrically by the machine center controller as a function of the shaft rotational speed. For example, if the rotation speed is decreasing due to a change in trajectory, the machining center controller 190 may slow down the relative translational motion to maintain a near constant rotation speed of the shaft 250 and cutting insert 130. Reducing relative translational motion should reduce the stresses between the workpiece 140 and the cutting insert 130 allowing for an increase in rotational speed. In effect, the sensor module 230 in connection with the wireless transmitter 260 and wireless receiver 170 provides a feedback loop to the machining center controller 190 that may otherwise not exist when operating fluid driven cutting tool spindles 200 without the sensor module 230.

According to some embodiments, the machining center controller 190 may be configured to operate a valve or other means capable of adjusting the pressure or flow rate of driving fluid for the fluid driven cutting tool spindle 200. Therefore the machining center controller 190 may be able to increase the pressure within the fluid channel 240 in an attempt to increase shaft rotation speed if the sensor module 230 senses an unexpected reduction is rotational speed. In other embodiments, the machining center controller 190 may be configured to shut off fluid to the fluid driven cutting tool spindle 200 if the shaft's rotational speed experiences a significant unexpected spike. Such a spike in the rotational speed of the shaft 250 may be an indication that the cutting insert 130 has broken and the machining center 100 should be shut off and maintenance performed.

Several different approaches have been considered by the inventors for implementing the improved machining centers disclosed herein. In one embodiment, a conventional machining center and conventional fluid driven cutting tool spindle may be retrofit to allow the disclosed communication and functions between the spindle and the machining center. The retrofit may be provided by a kit. The kit may include the sensor module 230, a wireless receiver 170, and components for operatively connecting the wireless receiver to the machine center controller 190 such that the machine center controller receives a signal having information that is understandable by the machine center controller for determining accessibility of the enclosure. The signal may provide understandable information in a form similar to data traditionally provided to a machine control system from an encoder. The components for operatively connecting may include hardware to operably connect the wireless receiver to the machining center controller. The components for operatively connecting may also include hardware or software if necessary to convert data from the sensors into the appropriate format for use by the machining center controller.

The optional hardware or software for translating the sensor data into a usable signal for the machine center controller may be contained within or accessed by the machine center controller. For example, software may be provided on a computer readable medium for installation onto said memory. Alternatively, the software may be stored on a computer readable medium that is not provided with the kit. Instead, the software may be downloaded by the machining center controller by accessing an internet address, requesting the software for download, providing an access key or verification, and receiving into memory of the machining center controller the software requested.

In other embodiments, the optional hardware or software may be pre-installed within the sensor module 230. In other embodiments, the optional hardware or software may be incorporated into a module with the wireless receiver 170.

The components for operatively connecting the wireless receiver to the machine center controller 190 may take any number of forms known in the art. For example, a wired connection may be made with a pre-exiting port provided on the machine center controller. Alternatively, a port may be included in the kit for joining to the machine center controller's mother board or other bus. In still other embodiments, the wireless receiver can be wired to or even mounted to machine center controller's mother board or Bus. Each of these embodiments may be collectively described as a controller connector.

Some fluid driven spindles are available with wireless sensor modules already included. These modules communicate with an independent display traditionally unable to function in association with the machine center controller as set out in this disclosure. Therefore an example retrofit kit for a conventional machining center in use with a fluid driven spindle that previously includes a sensor and output display may comprise only the components for operatively connecting the display/receiver to the machine center controller.

In some other embodiments a conventional machining center with electric spindles may be retrofit with a kit having the fluid driven cutting tool spindle 200 and the sensor module 230, a wireless receiver 170, components for operatively connecting the wireless receiver to the machine center controller 190.

In other embodiments, the operator may be provided with a machining center built specifically to perform the functions discussed in this disclosure. In this embodiment, the wireless receiver 170 may be integrated with the machine center controller 190.

Other ways to implement controlling machining center parameters, such as the locking and unlocking of a door latch, or adjustment of fluid pressure, using wireless signals from a sensor, which monitors fluid driven cutting tool spindle operating conditions may also be possible. These other examples include, but are not limited to, using a control system that bypasses the machining center controller of a conventional machining center completely.

Figure 6:
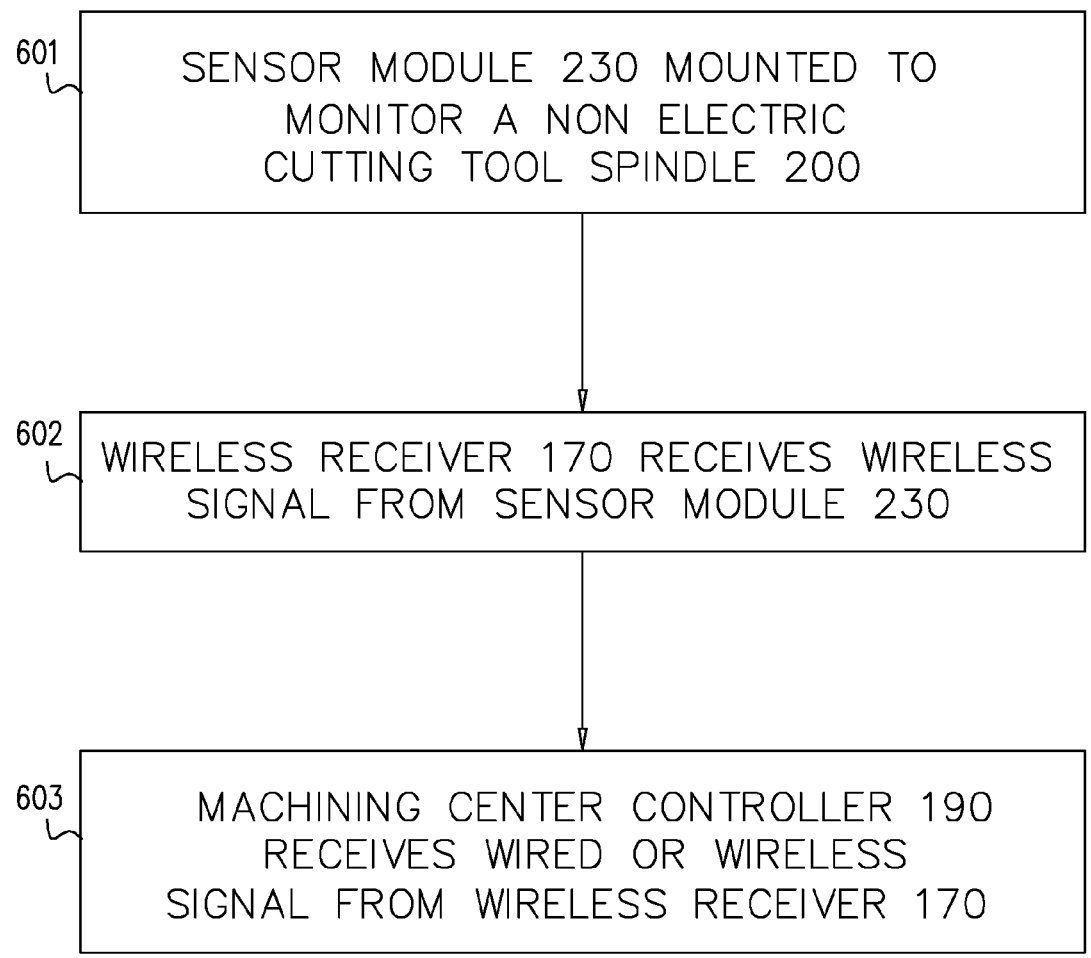
FIG. 6 shows a flow chart of an embodiment of the operation of the machining center of the present disclosure.

FIG. 6 provides a general flow chart illustrating the operation of machining centers according to embodiments of the present disclosure. A sensor module 230 monitors the shaft of a fluid driven cutting tool spindle 200 at step 601. Wireless transmission occurs between the sensor module 230 and a wireless receiver 170 at step 602. The machining center controller 190 then receives a signal from the wireless receiver 170 either directly or indirectly by wired or wireless transmission at step 603.

Figure 7:
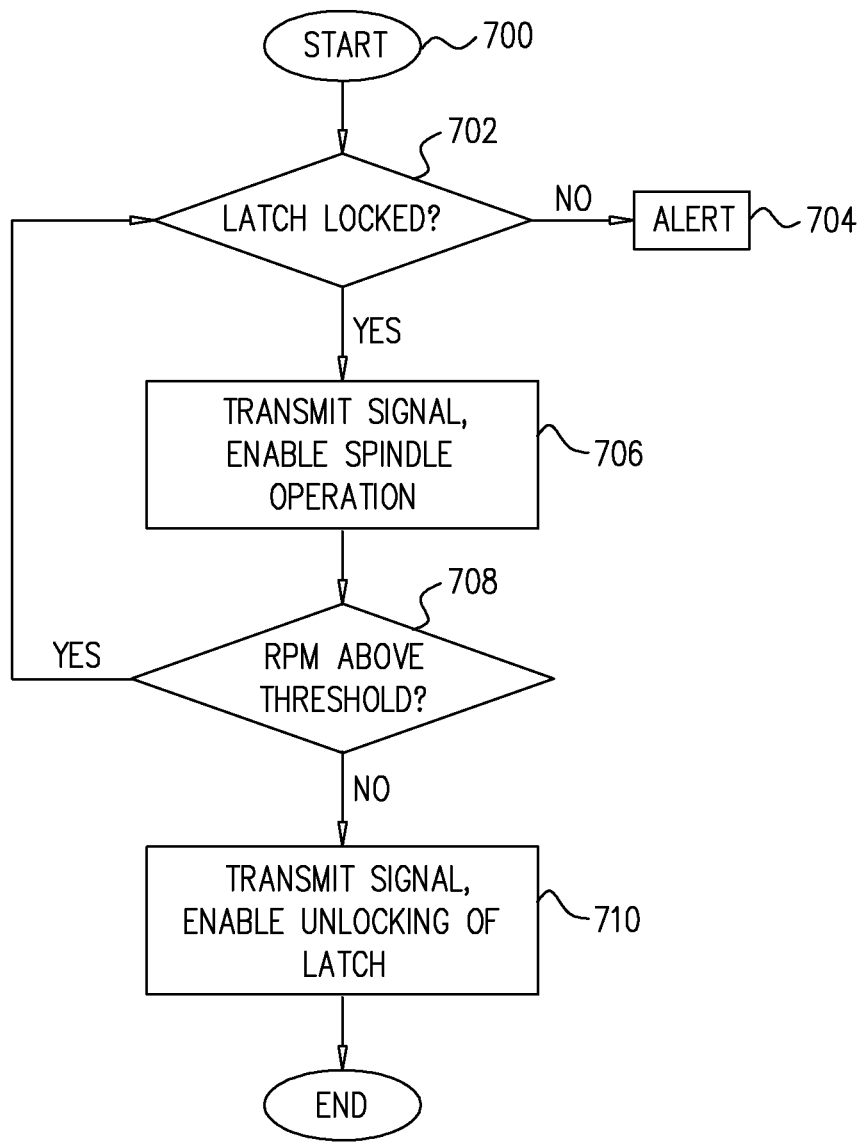
FIG. 7 shows a flow chart according to some door monitoring embodiments of the machining center of the present disclosure.

FIG. 7 shows an example decision tree using the disclosed machining center to control access thereto. The process starts at step 700. The locked or unlocked condition of the latch 150 may be initially checked at step 702. If the latch 150 is unlocked, an alert may be sent to the operator at step 704. If the latch 150 is locked, the machining center controller 190 will enable spindle operation through the provision of driving fluid and current to the necessary electrical components at step 706. The operating conditions of the fluid driven cutting tool spindle 200 may then be monitored to determine whether the RPM of the spindle meets a predetermined access criteria, such as whether the RPM is above a predetermined threshold (step 708). If the RPM fails to meet the access criteria, the system returns to confirm that the latch 150 remains locked. If the RPM is determined to meet the access criteria, the machining center controller can be signaled to unlock the latch or enable the user to unlock the latch (step 710). The process ends when the fluid driven cutting tool spindle is spinning at a rate meeting the predetermined access criteria and the latch is unlocked, which means the operator is able to access the interior of the machining center 100 to replace the tool or the workpiece.

FIG. 8 shows an example decision tree using the disclosed machining center 100 to adjust the operating parameters thereof. The process may start at step 800. The wireless sensor 230 is continuously or periodically monitoring or determining the RPM of the shaft or the cutting tool of a fluid driven cutting tool spindle 200 at step 802. The wireless sensor 230, alone or in combination with the machining center controller 190 monitors for changes in RPM of the shaft or cutting tool as the spindle is removing material from a workpiece. Monitoring for changes in RPM is shown as step 804. If no change in speed above a threshold is found, the controller can loop back for another data point from the sensor module that is monitoring the spindle RPM. If the shaft has changed speed above a threshold, the presence of a spike can be determined (step 806). A spike is understood as a significant change in speed in a very short amount of time, for example one, two, or less than 10 sampling periods. Spike criteria can define both change in velocity and duration of the change. For example, a change in tool velocity from a working condition to a no load velocity, within a very short amount of time, would be one form of a spike. Similarly, a change in tool velocity from a working condition to a near zero velocity, within a very short amount of time, would be another form of a spike. If a spike, up or down, is found, the controller can signal to stop processing and disable operation (step 808). If no spike, i.e. significant change in rotational speed, is sensed, the controller may determine whether the change in rotational speed was an increase or a decrease (step 810). The controller may then wish to counteract the change in rotational speed. Therefore, if the rotational speed increased, translational speed can increase to apply more pressure at the cutting insert (step 812). Relative translational speed can be increased by increasing the speed of the workpiece or the translational speed of the spindle or both. Alternatively, the fluid pressure applied to the fluid powered cutting tool spindle 200 may be decreased by signaling the appropriate valves and/or pumps. If the rotational speed (RPM) decreased, the translational speed can decrease to reduce pressure at the cutting insert (step 814). Relative translational speed can be decreased by decreasing the speed of the workpiece or the translational speed of the spindle or both. Alternatively, the fluid pressure applied to the fluid driven cutting tool spindle 200 may be increased by signaling the appropriate valves and/or pumps.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A machining center having at least one door to control access to an enclosure thereof, the machining center comprising:
   a latch having a locked position and an unlocked position to control an ability to open the at least one door;
   a fluid driven cutting tool spindle, the fluid driven cutting tool spindle having a fluid driven shaft;
   at least one sensor configured to monitor at least one operating condition of the fluid driven cutting tool spindle;
   a wireless transmitter configured to receive sensor information from the at least one sensor, and transmit said sensor information;
   a controller managing at least one processing condition of the machining center;
   a wireless receiver in wireless communication with the wireless transmitter and in communication with at least one of the controller and the latch;
   wherein, in response to sensor information received by the wireless receiver from the wireless transmitter, at least one function of the machining center is adjusted; and
   wherein the at least one function is the latch position, adjusted when the at least one operating condition meets predetermined access criteria.

2. The machining center according to claim 1, wherein latch position is managed by the controller.

3. The machining center according to claim 1, wherein:
   the at least one operating condition includes the rotational speed of the shaft, and
   the latch is in the locked position unless the access criteria is met, the access criteria providing a maximum allowable rotational speed.

4. The machining center according to claim 1, wherein:
   the at least one operating condition includes characteristics of the driving fluid, and
   the at least one sensor monitors the magnitude of the fluid pressure used to rotate the shaft.

5. The machining center according to claim 1, wherein
the machining center further comprises a workpiece support; and
the at least one function is one of the processing conditions.

6. The machining center according to claim 5,
wherein the operating condition is the rotational speed of the shaft, and the processing condition is a relative translational speed between the fluid driven cutting tool spindle and the workpiece support.

7. The machining center according to claim 5,
wherein the operating condition is the rotational speed of the shaft and the processing condition is a characteristic of the driving fluid.

8. The machining center according to claim 1, wherein
the at least one operating condition includes the rotational speed of the shaft, and
the latch is in the locked position unless the at least one sensor indicates that the shaft is at rest.

9. The machining center according to claim 1, wherein
the at least one operating condition includes the rotational speed of the shaft, and
the latch is in the locked position unless the access criteria is met, the access criteria providing a maximum allowable rotational speed.

10. The machining center according to claim 1, wherein the at least one sensor is one from the group consisting of:
(a) a non-contact optical sensor; and
(b) an electromagnetic sensor.

11. The machining center according to claim 1, wherein
the at least one operating condition includes characteristics of the fluid, and
the at least one sensor monitors the magnitude of the fluid pressure used to rotate the shaft.

12. The machining center according to claim 1, wherein
the at least one operating condition includes translational motion of the fluid driven cutting tool spindle, and
the at least one sensor comprises an accelerometer.

13. The machining center according to claim 1, wherein
the at least one sensor comprises a plurality of sensors, and
the latch is in the unlocked position when all of the plurality of sensors sense the operating conditions meeting the access criteria.

14. The machining center according to claim 1, wherein
the machining center further comprises a machine spindle, a workpiece support and a controller, the controller managing at least one managed parameter, the managed parameter comprising translational motion of at least one of the machine spindle and the workpiece support, or a property of the fluid driving the cutting tool spindle;
the fluid driven cutting tool spindle is mounted within the machine spindle;
the at least one sensor monitors the rotational speed of the shaft as the at least one operating condition;
the wireless receiver is in communication with the controller; and
the controller adjusts at least one of the managed parameters in response to changes in rotational speed of the shaft.

15. The machining center according to claim 1, further comprising:
a machine spindle; and
a workpiece support; wherein:
the fluid driven cutting tool spindle is mounted to the machine spindle;
the at least one sensor monitors a rotational speed of the fluid driven shaft;
the controller manages translational motion of at least one of the machine spindle and the workpiece support; and
the controller adjusts relative translational motion between the machine spindle and the workpiece support, in response to changes in rotational speed of the fluid driven shaft.

16. A fluid driven high-speed spindle system for installation within a machining center, the machining center having at least one door with a latch to control access to an enclosure thereof, and a machine center controller for operating the machining center, the system comprising:
a spindle having a shaft that is capable of being rotated by pressurized fluid;
a wireless sensor module capable of monitoring at least one operating condition of the spindle, the wireless sensor module including at least one sensor and a wireless transmitter;
a wireless receiver capable of receiving signals sent from the wireless transmitter of the sensor module; and
a controller connector for operably connecting the wireless receiver to the machining center controller,
wherein the controller connector is configured to relay information, corresponding to the at least one operating condition, to the machine center controller in a format usable by the machine center controller for adjusting at least one function of the machining center in response to said at least one operating condition received by the wireless receiver; and
wherein adjusting at least one function comprises controlling access to the enclosure based upon predetermined access criteria.

17. A machining center conversion kit for installation with a machining center, the machining center having at least one door to control access to an enclosure thereof, a machine center controller for operating the machining center, and a fluid driven spindle having a rotatable shaft operably disposed within the enclosure, the kit comprising:
a wireless sensor module capable of monitoring at least one operating condition of the fluid driven spindle, the wireless sensor module including at least one sensor and a wireless transmitter;
a wireless receiver capable of receiving signals sent from the wireless transmitter of the sensor module; and
a controller connector for operably connecting the wireless receiver to the machining center controller,
wherein the kit is configured to relay information, corresponding to the at least one operating condition, to the machine center controller in a format usable by the machine center controller for controlling access to the enclosure based upon predetermined access criteria; and wherein:
the at least one sensor comprises a plurality of sensors, and
a latch locking the door is in the unlocked position when each of the plurality of sensors senses the operating conditions meeting predetermined access criteria.

18. The machining center conversion kit according to claim 17, wherein the kit is configured to relay the information in the usable format using software stored on one from the group consisting of:
(a) a computer readable medium incorporated within the machine center controller;
(b) a computer readable medium housed within the wireless sensor module; and (c) a computer readable medium housed within a unit comprising the wireless receiver.

19. The machining center conversion kit according to claim 17, wherein
the at least one operating condition includes the rotational speed of the shaft; and
at least one of said plurality of sensors is one from the group consisting of:
(a) a non-contact optical sensor; and
(b) an electromagnetic sensor.

20. The machining center conversion kit according to claim 17, wherein:
the at least one operating condition includes characteristics of a fluid configured to drive the fluid driven spindle, and
at least one of said plurality of sensors monitors the magnitude of the fluid pressure used to rotate the shaft.

21. The machining center conversion kit according to claim 17, wherein:
the at least one operating condition includes translational motion of the fluid driven spindle, and
at least one of said plurality of sensors comprises an accelerometer.

22. The machining center conversion kit according to claim 17, wherein:
the information enables the at least one operating condition monitored by at least one of said plurality of sensors to influence adjustment of the speed of translational motion of the fluid driven spindle in response to changes in rotational speed of the shaft sensed by the wireless sensor module.

23. The machining center conversion kit according to claim 17, wherein:
a data signal with the information sent from at least one of said plurality of sensors via the wireless transmitter to the wireless receiver is directly usable by the machine center controller.

24. The machining center conversion kit according to claim 17, further comprising:
a software product which, when executed, converts a data signal containing the information, received by the wireless receiver, to be usable by the machine center controller.

25. The machining center conversion kit according to claim 17, further comprising:
a software product which, when executed, converts a data signal containing the information, received through the controller connector to be usable by the machine center controller.

26. A machining center conversion kit for installation with a machining center, the machining center having at least one door to control access to an enclosure thereof, a machine center controller for operating the machining center, and a fluid driven spindle with at least a wireless sensor operably disposed within the enclosure, the wireless sensor monitoring at least one operating condition of the fluid driven spindle, the kit comprising:
a controller connector for operably coupling the wireless sensor to the machine center controller; and
a wireless transmitter connectable to the wireless sensor, and configured to wirelessly send signals received from the wireless sensor;
wherein the controller connector is configured to relay information, corresponding to the at least one operating condition, to the machine center controller in a format usable by the machine center controller for controlling access to the enclosure based upon predetermined access criteria.

27. The machining center conversion kit according to claim 26, wherein the kit includes a software product that converts a data signal containing the information, received through the controller connector to allow the machine center controller to determine accessibility of the enclosure.

28. The machining center according to claim 1, wherein the cutting tool spindle is a liquid-driven spindle.

29. The fluid driven high-speed spindle system according to claim 16, wherein the spindle is a liquid-driven spindle.

30. The machining center conversion kit according to claim 17, wherein:
the fluid driven spindle is a liquid driven spindle, and
said wireless senor module is capable of monitoring at least one operating condition of the liquid- driven spindle.

* * * * *